United States Patent [19]

Nakazawa

[11] Patent Number: 4,742,366
[45] Date of Patent: May 3, 1988

[54] CAMERA HAVING MEANS FOR RECEIVING A FILM CASSETTE

[75] Inventor: Hiroshi Nakazawa, Tokyo, Japan
[73] Assignee: Hybrid Corporation, Japan
[21] Appl. No.: 945,977
[22] Filed: Dec. 24, 1986

[30] Foreign Application Priority Data

Sep. 9, 1986 [JP] Japan .............. 61-137282[U]

[51] Int. Cl.$^4$ .............. G03B 17/42; G03B 17/02
[52] U.S. Cl. .................. 354/204; 354/219; 354/275; 354/288
[58] Field of Search .............. 354/202, 204, 212, 219, 354/288, 275

[56] References Cited

U.S. PATENT DOCUMENTS

| | | | |
|---|---|---|---|
| 3,603,232 | 9/1971 | Jones | 354/212 |
| 3,613,541 | 10/1971 | Beach | 354/212 |
| 3,631,783 | 1/1972 | Jones | 354/288 |
| 3,731,586 | 5/1973 | Meazza | 354/219 |
| 3,782,259 | 1/1974 | Noble | 354/212 |
| 3,906,535 | 9/1975 | Takahama et al. | 354/288 |
| 4,077,041 | 2/1978 | Imura | 354/288 |

FOREIGN PATENT DOCUMENTS 1203149 1/1960 France .
652656 6/1985 Japan .

Primary Examiner—A. A. Mathews
Attorney, Agent, or Firm—Ostrolenk, Faber, Gerb & Soffen

[57] ABSTRACT

A camera comprises a box-shaped housing open on the back side and including a front wall, end walls, a bottom wall and a top wall; an exposure chamber formed integral with said bottom wall at a central area thereof and open on the back side to provide an exposure window; a film cartridge receiving chamber defined by said walls of the housing and the side walls of said exposure chamber and open on the back side to provide an access opening; spring means formed on the bottom wall of said cartridge receiving chamber; on the opposite sides of said exposure chamber, a film cartridge adapted to be loaded in said cartridge receiving chamber and including film storage and film take-up portions for engaging said spring means and a film guide portion connecting between said storage and take-up portions; said cartridge receiving chamber including first and second compartments for receiving said film storage and take-up portions of the film cartridge, respectively; and two openings formed in said front wall of the housing in alignment with said film storage and take-up portions of the film cartridge, respectively.

20 Claims, 3 Drawing Sheets

U.S. Patent May 3, 1988 Sheet 1 of 3 4,742,366
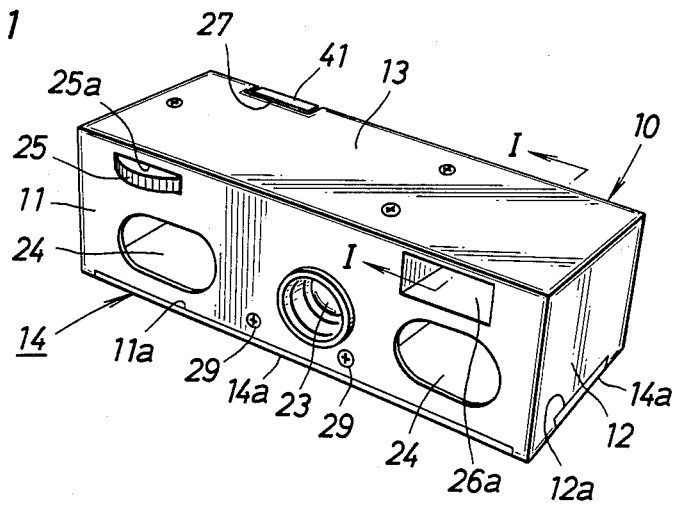
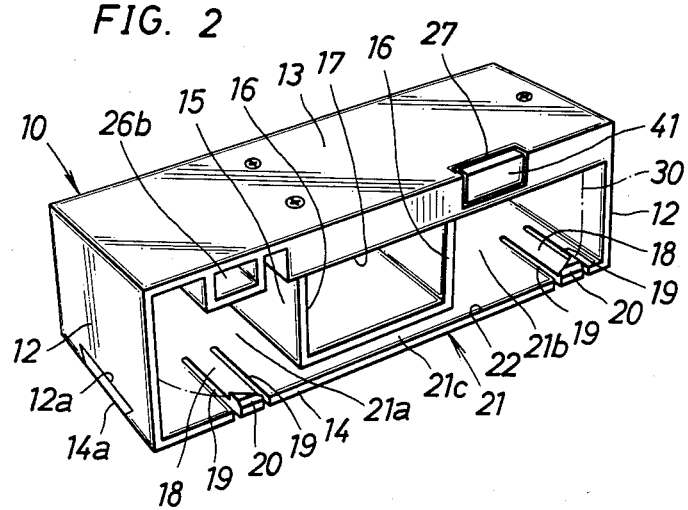
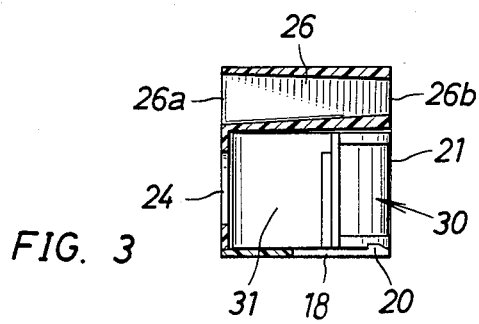
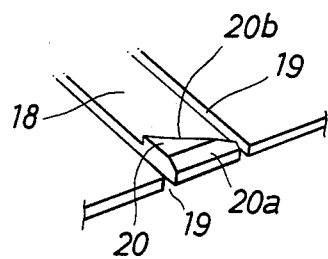
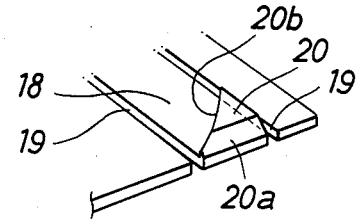

CAMERA HAVING MEANS FOR RECEIVING A FILM CASSETTE

BACKGROUND OF THE INVENTION

This invention relates to a camera employing a cartridge film and more particularly, to a so-called 110 size small type camera.

A variety of prior art cameras of the type have been conventionally proposed. In the prior art cameras of the type, it has been conventionally practiced that a film is loaded in the body or housing of the camera and the open back of the housing is then closed by the lid on the back of the camera as in the case of employment of a patrone film. However, of late, as shown in FIGS. 8 and 9 of the accompanying drawings, the camera having a simplified construction has been known in which a film cartridge 130 is loaded into the camera housing 100 from the open back of the housing and the cartridge is held in position by the back lid 103 pivoted to the back of the camera housing (see Japanese Industrial Design Reg. No. 652656, for example).

However, the conventional camera having such a simplified construction is not pleasing in appearance because the film cartridge 130 is exposed on the opposite ends of the camera housing. Also, since the holding of the film cartridge 130 in position against displacement is effected by pressing the back lid 103 against the back of the U-shaped cross-section film guide portion 133 connecting between the film storage portion 131 and film take-up portion 132 of the film cartridge 130, the film cartridge tends to be unstably held in position. Furthermore, the opening and closing operation of the back lid 103 to be effected each time the film cartridge is loaded into and taken out of the camera housing is substantially similar to the opening and closing operation of the above-mentioned back lid in the prior art camera, so it can not be said that the camera disclosed in the above-mentioned Japanese Design Registration No. 652656 is simplified in construction as far as this point is concerned.

SUMMARY OF THE INVENTION

The present invention has as its object to provide a camera which eliminates the difficulties inherent in the prior art camera.

The preferred embodiment of the present invention which attains the above-mentioned object will be in brief described hereinbelow.

The cartridge receiving chamber in which the film cartridge is to be loaded is open on the back side to provide an access opening through which the cartridge is loaded into the cartridge receiving chamber. The bottom wall of the camera housing which forms a part of the cartridge receiving chamber is formed with spring boards on which the film storage and take-up portions of the film cartridge rest when the film cartridge is loaded in the cartridge receiving chamber. Each of the spring boards is formed at the rear end portion with a projection to be engaged by a respective one of the cartridge film storage and take-up portions. The front wall of the camera housing which forms another part of the cartridge receiving chamber is formed with window openings which respectively face the film storage and take-up portions of the film cartridge when the cartridge is loaded in the cartridge receiving chamber.

In the camera according to the present invention, since the cartridge receiving chamer is open only on the back side, the film cartridge loaded in the cartridge receiving chamber will not be exposed in an unsightly manner. And the loading and removal of the film cartridge into and out of the cartridge receiving chamber through the access opening on the back side of the cartridge receiving chamber can be simply effected, with the projections held in their depressed down position against the resilience of the spring. The removal of the film cartridge is accelerated especially by pushing the film storage and take-up portions of the film cartridge on the front faces of the cartridge portions through the window opening in the front wall of the camera housing by the user's finger or fingers.

Once loaded in the cartridge receiving chamber, the film cartridge is held in position against inadvertent displacement because the lower ends of the film storage and take-up portions of the film cartridge engage the projections on the spring boards to depress the projections downward. The film cartridge will not move out of the cartridge receiving chamber unless the projections are intentionally depressed down against the resilience of the spring boards.

According to the present invention, there has been provided a camera which comprises a box-shaped housing open on the back side and including front, end, top and bottom walls, an exposure chamber formed integrally with said bottom wall at a central area thereof and said exposure chamber being open on the back side to provide an exposure window, a film cartridge receiving chamber defined by said walls of the housing and by the side walls of said exposure chamber and open on the back side to provide an access opening, said cartridge receiving chamber including first and second compartments on the opposite sides of said exposure chamber, spring means formed on the bottom wall of said housing within said first and second compartments and having engaging means, a film cartridge adapted to be loaded in said cartridge receiving chamber and including film storage and take-up portions to be received in said first second compartments of the cartridge receiving chamber, respectively and a film guide portion, connecting between said storage and take-up portions and two openings formed in said front wall of the housing in alignment with said film storage and take-up portions of the film cartridge, respectively.

The above and other objects and attendant advantages of the present invention will be more readily apparent to those skilled in the art from a reading of the following detailed description in conjunction with the accompanying drawings which show one preferred embodiment of the present invention for illustration purposes only, but not for limiting the scope of the same in any way.

BRIEF DESCRIPTION OF THE DRAWINGS

FIG. 1 is a perspective front elevational view of the preferred embodiment of the camera according to the present invention;

FIG. 2 is a perspective rear elevational view of said camera;

FIG. 3 is a cross-sectional view taken substantially along the line I—I and as seen in the arrow direction in FIG. 1;

FIG. 4A is a fragmentary perspective view on an enlarged scale of the left-hand side spring board with the projection;

FIG. 4B is a fragmentary perspective view on an enlarged scale of the right-hand side spring board with the projection;

PREFERRED EMBODIMENT OF THE INVENTION

Figure 5:
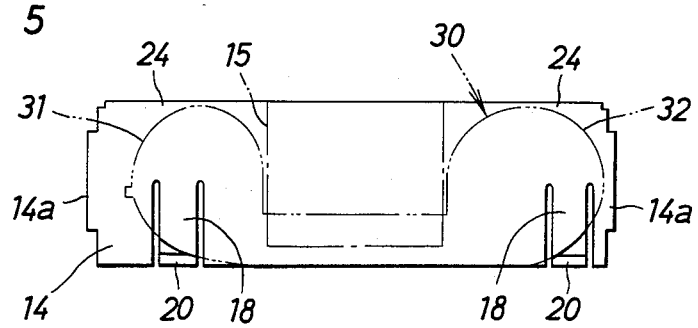
FIG. 5 is a schematic view showing the positional relationship of some components of said camera when the film cartridge is loaded in the camera.
Figure 6:
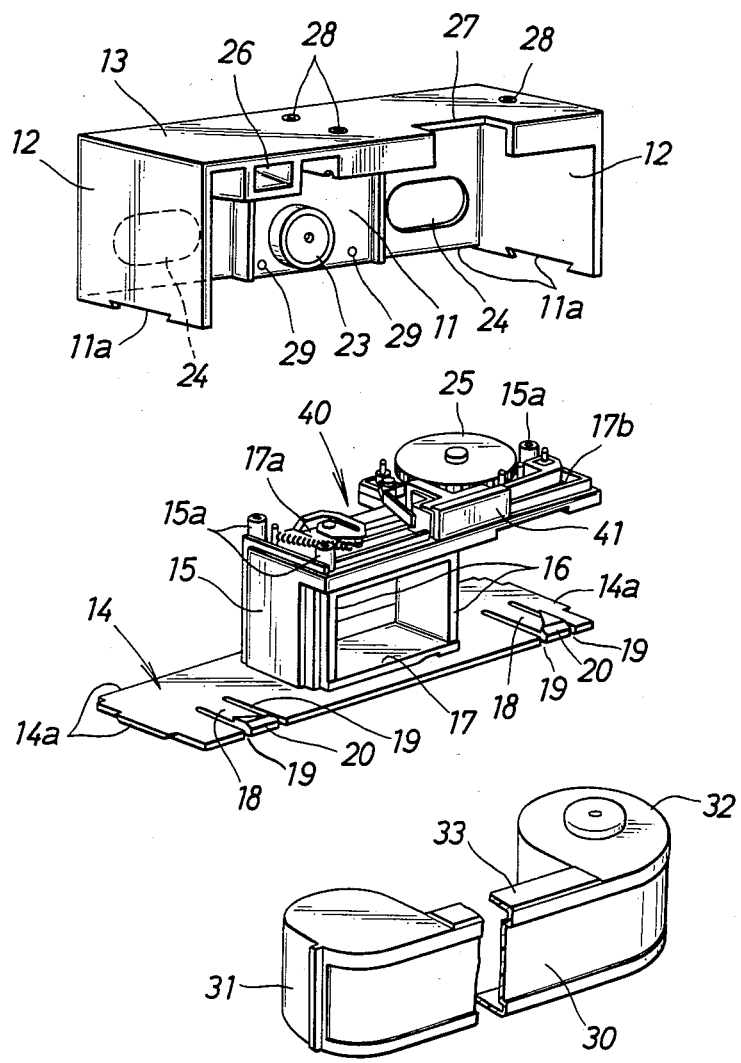
FIG. 6 is an exploded perspective view of said camera.

The present invention will be now described referring to the accompanying drawings and more particularly, to FIGS. 1 to 7 thereof in which the preferred embodiment of the present invention is illustrated. The camera generally comprises a box-shaped housing which is generally shown by reference numeral 10 and open on the back side thereof. The housing 10 includes a front side wall 11, end walls 12, 12 and a top wall 13 which are integrally formed, and a separate bottom wall 14.

The bottom wall 14 has an exposure chamber 15 formed integrally with the upper surface of the bottom wall 14 at a central area thereof and the exposure chamber 15 is defined by the opposite side walls 16 and is open on the back side thereof to provide an exposure window 17. The bottom wall 14 is further formed with spring boards 18 between the end walls 12 of the housing 10 and the side walls 16 of the exposure chamber 15. Each of the spring boards 18 is formed by two parallel and spaced slits 19 which extend from the rear edge of the bottom wall 14 and terminate short of the front wall 11 of the housing 10. The spring board 18 is formed at the rear end portion with an upwardly extending projection 20 which has a substantially triangular shape and includes a rear ramp 20a and a front vertical face 20b (FIGS. 4A and 4B).

The exposure chamber 15 further has a shutter (not shown) provided in the front side thereof.

A so-called 110 size film cartridge 30 is adapted to be loaded in the housing 10 and includes a film storage portion 31 adapted to be snugly fitted in the cavity or first compartment defined by the housing walls 11, 12, 13 and 14 and one of the side walls 16 of the exposure chamber 15, a film take-up portion 32 adapted to be snugly fitted in the cavity or second compartment defined by the housing walls 11, 12, 13 and 14 and the other side wall 16 of the exposure chamber 15 and a U-shaped cross-section film guide portion 33 connecting between the film storage and take-up portions 31 and 32 and adapted to face the exposure window 17 of the exposure chamber 15. Thus, once loaded in the housing 10, the film cartridge 30 is held in position against displacement in all directions except for in the rearward direction.

When the film cartridge 30 is loaded in the camera housing 10, the cartridge depresses down the projections 20 and accordingly, the spring boards 18 and thus, the projections 20 abut against the film storage and take-up portions 31 and 32 whereby the film cartridge 30 is positively prevented from displacement even in the backward direction unless the projections 20 are forcibly pushed down (in the conventional camera, the backward displacement of the cartridge is prevented by the hinged back lid 103 as described hereinabove).

Reference numeral 25 denotes a film winding wheel mounted on a vertical shaft extending upwardly from an extension 17b of the top wall 17a of the exposure chamber 15 and adapted to pay out a film wound on the reel within the film storage portion 31 and to wind the film onto the reel within the film winding-up portion 32.

Reference numeral 40 denotes a shutter operation mechanism which is adapted to cock the shutter upon the initiation of film winding and release the shutter upon the pushing-down of the push button 41 and the shutter operation mechanism 40 is mounted on the top wall 17a of the exposure chamber 15 and an extension 17b of the top wall 17a.

The top wall 13 is integrally formed with the front wall 11 and the end walls 12 and forms the camera housing 10 in cooperation with the bottom wall 14 which is a component formed separately from the top, front and end walls. The housing 10 is open on the back side to provide a cartridge receiving chamber 21 having an access opening 22.

The cartridge receiving chamber 21 comprises the first compartment 21a for receiving the film storage portion 31, the second compartment 21b for receiving the film take-up portion 32 and a rest 21c positioned behind the exposure chamber 15 (more particularly, the exposure window 17 for supporting the film guide portion 33).

Reference numeral 23 denotes a photographing lens mounted in the housing front wall 11 and reference numeral 24 denotes window openings formed in the housing front wall on the opposite sides of the lens 23 and spaced therefrom. When the film cartridge is to be removed out of the camera housing 10, the user inserts his finger or fingers into the window openings 24 to push the film storage and take-up portions 31, 32 of the film cartridge 30 out of the cartridge receiving chamber 21.

Reference numeral 25a denotes an elongated slot formed in the housing front wall 11 above one of the window openings 24 and a portion of the periphery of the winding wheel 25 associated with the film take-up portion 32 of the film cartridge 30 projects forwardly of the slot 25a.

Reference numeral 26 denotes a finder integral with the top wall 13 on the side of the film storage portion 31 of the cartridge 30 in a position above the other window opening 24 with the largest diameter portion 26a opening on the housing front wall 11 and the smallest diameter portion 26b opening at the rear side edge of the housing top wall 13. Reference numeral 27 denotes a window opening formed at the side edge of the housing top wall 13 and the above-mentioned push button 41 of the shutter operation mechanism 40 is fitted in the window opening 27.

The integral front, end and top wall assembly 11, 12, 13 and the bottom wall 14 are connected together by fitting the tongues 14a at the front side edge and the opposite end edges of the bottom wall 14 into the groove 11a formed at the lower end edge of the front wall 11 and the grooves 12a formed at the lower end edges of the opposite end walls 12, respectively, and the camera housing 10 and exposure chamber 15 are connected together by screwing rivets through holes 28 in the housing top wall 13 into integrally threaded projections 15a extending vertically upwardly from the exposure chamber 15 and through holes 29 in the housing front wall 11 into the front wall (not shown) of the exposure chamber 15, respectively.

Thus, the camera can be easily assembled by providing the integrally formed top, front and end wall assembly and the separate bottom wall, mounting the photographing lens 23 in the top, front and end wall assembly, mounting the shutter, shutter operation mechanism 40, film winding wheel 25, shutter or push button 41 and so on upon the bottom wall and then fitting the top, front and end wall assembly and separate bottom wall together.

The film cartridge 30 can be easily mounted in the cartridge receiving chamber 21 by aligning the film cartridge 30 with the access opening 22 and then pushing the cartridge inwardly into the cartridge receiving chamber 21.

That is, when the film cartridge 30 is aligned with the access opening 22, the lower ends of the film storage and take-up portions 31, 32 of the cartridge 30 abut against the ramps 22a on the corresponding projections 20 and as the film cartridge 30 is then pushed further into the cartridge receiving chamber 21 the projections 20 automatically descend down against the resilience of the spring boards 18 to allow the film storage and take-up portions 31, 32 to pass over the projections 20 to a predetermined position where the film cartridge 30 is held in position against displacement in all directions by the side walls 16 of the exposure chamber 15 and the projections 20 on the spring boards 18 with the lower ends of the film storage and take-up portions 31, 32 of the film cartridge 30 engaging the vertical faces 20b of the projections 20.

And when the film cartridge 30 is desired to be taken out of the camera, it is only necessary to push one of the film storage and take-up portions 31, 32 of the film cartridge 30 or both the portions backwardly through the opening or openings 24 by the user's finger or fingers with the projection 20 pressed down.

Figure 7:
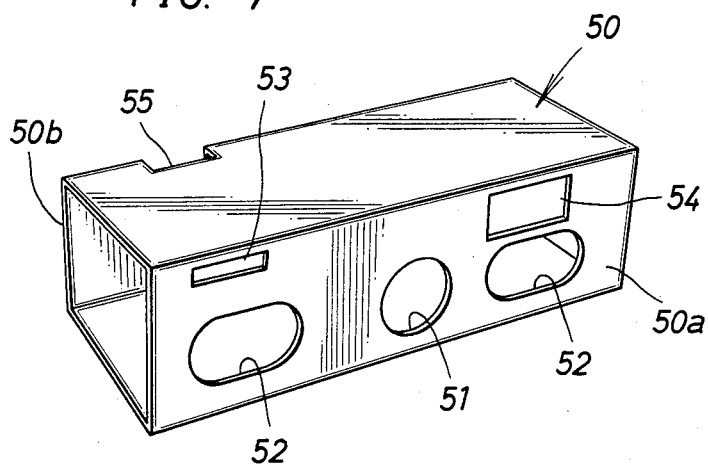
FIG. 7 is a perspective view of the outer casing for said camera.
Figure 8:
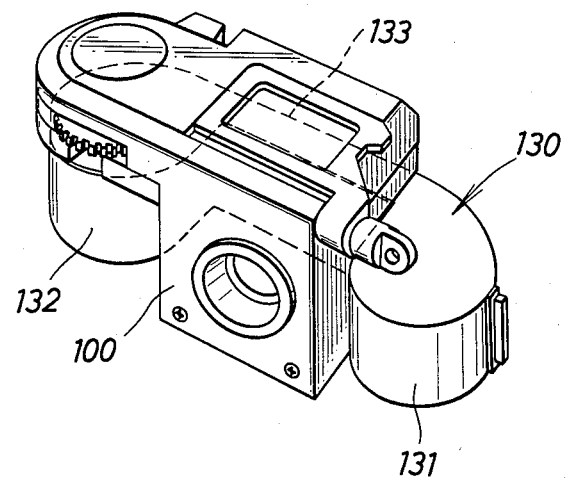
FIG. 8 is a perspective front elevational view of a prior art camera.
Figure 9:
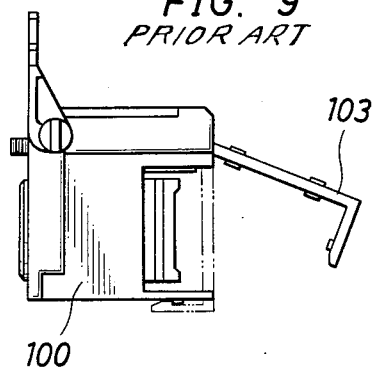
FIG. 9 is an end elevational view of said camera of FIG. 8.

FIG. 7 shows an elongated outer casing 50 which is open at the opposite ends and has suitable designs and/or advertisement indications on the outer surface. In use, the casing 50 is fitted on the camera housing 10. The casing 50 has a center opening 51, side openings 52 on the opposite sides of the center opening 51 and an opening 54 in the front wall 50a in alignment with the lens 23, openings 24 and the largest diameter portion 26a of the finder 25 in the front wall 11 of the camera housing 10, respectively, and an opening 55 in the back wall 50b in alignment with the push button 41 on the shutter operation mechanism 40, respectively.

As will be clear from the foregoing description on the preferred embodiment of the present invention, the invention has the following advantages:

(1) Since the film cartridge receiving chamber is open only on the back side, the film cartridge loaded in the chamber will not be exposed in an unsightly exposed.

(2) The film cartridge can be simply received into and taken out of the film cartridge receiving chamber via the access opening with the projections pressed down against the resilience of the spring boards.

(3) The removal of the film cartridge out of the cartridge receiving chamber is further accelerated by pushing the front surfaces of the film storage and take-up portions of the film cartridge through the openings 24 in the housing front wall 11 by the user's finger or fingers.

(4) Once loaded in the film cartridge receiving chamber, since the film cartridge is engaged at the lower ends of the film storage and take-up portions of the cartridge by the projections on the spring boards, the cartridge is positively held in position and will be prevented from inadvertently dislacing and as described hereinabove, the film cartridge will not move out of the film cartridge receiving chamber via the access opening unless the projections are intentionally depressed down against the resilience of the spring boards.

The advantages of the present invention, as well as certain changes and modifications of the disclosed embodiment thereof, will be readily apparent to those skilled in the art. It is the applicant's intention to cover by the applicant's claims all those changes and modifications which could be made to the embodiment of the invention herein chosen for the purpose of the disclosure without departing from the spirit of the invention. Protection by Letters Patent of this invention in all its aspects as the same are set forth in the appended claims is sought to the broadest extent that the prior art allows.

What is claimed is:

1. A camera comprising a box-shaped housing open on the back side and including front, end, top and bottom walls;

an exposure chamber formed integrally with said bottom wall at a central area of said bottom wall, having side walls facing said end walls of said housing, and open on the back side to provide an exposure window;

a film cartridge receiving chamber defined by said walls of the housing and said side walls of said exposure chamber and open on the back side to provide an access opening, said cartridge receiving chamber including first and second compartments on the opposite sides of said exposure chamber;

spring means formed on the bottom wall of said housing within said first and second compartments and having engaging members;

a film cartridge adapted to be loaded in said cartridge receiving chamber and including film storage and take-up portions to be received in said first and second compartments of the cartridge receiving chamber, respectively, and a film guide portion connecting between said storage and take-up portions; and two openings formed in said front wall of the housing in alignment with said film storage and take-up portions of the film cartridge, respectively.

2. The camera as set forth in claim 1, in which said front, end and top walls are integrally formed and said bottom wall is connected to said front and end walls by tongue and groove means.

3. The camera as set forth in claim 1, in which said spring means is a spring board formed by slits cut in said bottom wall within each of the compartments of said cartridge receiving chamber and said engaging member is a projection at the rear end of said spring board and includes a ramp and a vertical face disposed for engaging said film cartridge when loaded in said cartridge receiving chamber.

4. The camera as set forth in claim 1, in which said exposure chamber includes a shutter and a shutter button.

5. The camera as set forth in claim 4, further including a shutter operation mechanism mounted on said exposure chamber and adapted to cock said shutter upon the initiation of winding of a film in said film take-up portion of the film cartridge and to release said shutter upon the depression-down of said shutter button.

6. The camera as set forth in claim 1, further including a winding wheel rotatably supported on said exposure chamber to pay out the film wound on the reel within said film storage portion and wind said film onto the reel within said film take-up portion.

7. The camera as set forth in claim 1, further including a photographing lens mounted in said front wall of the housing between said two openings.

8. The camera as set forth in claim 1, further including finder means comprising an aperture formed in said top wall and extending from said back side to said front wall, said aperture having increasing cross-sectional area with the largest area portion open to said front wall of the housing and the smallest area portion open to the open back of the housing.

9. A camera comprising:
a housing with an open back portion and with front, end, top, and bottom wall portions;
an exposure chamber located adjacent a central area of said bottom wall portion, said exposure chamber having side wall portions facing said end wall portions of said housing, and having an open back portion to provide an exposure window;
a film cartridge receiving chamber defined by said wall portions of said housing and said side wall portions of said exposure chamber and having an open back portion to provide an access opening, said cartridge receiving chamber including first and second compartments on opposite sides of said exposure chamber;
film cartridge means configured for being loaded in said cartridge receiving chamber and including film storage and take-up portions to be received in said first and second compartments of the cartridge receiving chamber, respectively and a film guide portion interconnecting said storage and take-up portions; and
resilient means in said cartridge receiving chamber for resiliently engaging said cartridge means when said cartridge means is loaded in said cartridge receiving chamber, to secure said cartridge means in said chamber.

10. A camera as in claim 9, further comprising at least one opening formed in said front wall portion substantially in alignment with at least one of said film storage and take-up portions of said film cartridge means.

11. A camera as in claim 10, wherein a pair of said openings are formed in said front wall portion substantially in alignment with said film storage and take-up portions of said film cartridge means, respectively.

12. A camera as in claim 9, wherein said resilient means is located on the bottom wall portion of said housing within at least one of said first and second compartments.

13. A camera as in claim 12, wherein said resilient means comprises a spring board defined by a pair of slits in said bottom wall portion, having an engaging member at a rear portion thereof for engaging said film cartridge means.

14. A camera as in claim 13, wherein a respective said resilient means is located in each of said first and second compartments.

15. A camera for receiving a film cartridge having a predetermined configuration, including film storage and take-up portions, and a film guide portion interconnecting said film storage and take-up portions, said camera comprising:
a housing with an open back portion and with front, end, top, and bottom wall portions;
an exposure chamber located adjacent a central area of said bottom wall portion, said exposure chamber having side wall portions facing said end wall portions of said housing, and having an open back portion to provide an exposure window;
a film cartridge receiving chamber defined by said wall portions of said housing and said side wall portions of said exposure chamber and having an open back portion to provide an access opening for receiving said cartridge, said cartridge receiving chamber including first and second compartments on opposite sides of said exposure chamber;
said film cartridge receiving chamber being configured to receive said film cartridge, said film storage and take-up portions being received in said first and second compartments of the cartridge receiving chamber, respectively; and
resilient means in said cartridge receiving chamber for resiliently engaging said cartridge when said cartridge is received in said cartridge receiving chamber, to secure said cartridge in said chamber.

16. A camera as in claim 15, further comprising at least one opening formed in said front wall portion substantially in alignment with at least one of said first and second compartments.

17. A camera as in claim 16, wherein a pair of said openings are formed in said front wall portion substantially in alignment with said first and second compartments, respectively.

18. A camera as in claim 15, wherein said resilient means is located on the bottom wall portion of said housing within at least one of said first and second compartments.

19. A camera as in claim 18, wherein said resilient means comprises a spring board defined by a pair of slits in said bottom wall portion, having an engaging member at a rear portion thereof for engaging said film cartridge.

20. A camera as in claim 19, wherein a respective said resilient means is located in each of said first and second compartments.

* * * * *